United States Patent
Kociba et al.

(10) Patent No.: US 9,133,785 B2
(45) Date of Patent: Sep. 15, 2015

(54) OXYGEN SENSOR OUTPUT CORRECTION SYSTEMS AND METHODS

(76) Inventors: Michael L. Kociba, Hartland, MI (US); Bradley Gibson, Swartz Creek, MI (US); Eric M. Hall, Rochester Hills, MI (US); Geoffrey McNabb, Waterford, MI (US)

(*) Notice: Subject to any disclaimer, the term of this patent is extended or adjusted under 35 U.S.C. 154(b) by 637 days.

(21) Appl. No.: 13/457,905

(22) Filed: Apr. 27, 2012

(65) Prior Publication Data

US 2013/0289848 A1 Oct. 31, 2013

(51) Int. Cl.
- *F02D 41/26* (2006.01)
- *F02D 41/12* (2006.01)
- *F02D 41/14* (2006.01)
- *F02D 41/24* (2006.01)
- *F01N 3/22* (2006.01)

(52) U.S. Cl.
CPC .......... *F02D 41/123* (2013.01); *F02D 41/1441* (2013.01); *F02D 41/1456* (2013.01); *F02D 41/2438* (2013.01); *F02D 41/2474* (2013.01); *F01N 3/22* (2013.01)

(58) Field of Classification Search
CPC .............. F02D 41/1456; F02D 41/1486
USPC .......... 73/114.73, 114.69; 123/325, 332, 481, 123/693, 694, 695, 696, 974, 988; 701/103, 701/104
See application file for complete search history.

(56) References Cited

U.S. PATENT DOCUMENTS

| | | | | |
|---|---|---|---|---|
| 4,305,249 A | * | 12/1981 | Schmid et al. | 60/274 |
| 4,753,203 A | * | 6/1988 | Yamada | 73/23.32 |
| 5,060,611 A | * | 10/1991 | Krampe et al. | 123/320 |
| 7,610,142 B1 | * | 10/2009 | Hoard et al. | 701/109 |
| 8,108,130 B2 | * | 1/2012 | Scheuerer | 701/109 |
| 8,918,266 B2 | * | 12/2014 | Weiss et al. | 701/103 |
| 2010/0108045 A1 | * | 5/2010 | Enomoto et al. | 123/674 |
| 2011/0073086 A1 | * | 3/2011 | Bahlo et al. | 123/703 |
| 2011/0107740 A1 | * | 5/2011 | Elwart et al. | 60/273 |
| 2012/0325662 A1 | * | 12/2012 | Inagaki et al. | 204/435 |

FOREIGN PATENT DOCUMENTS

| | | |
|---|---|---|
| DE | 37 44 222 A1 | 7/1989 |
| DE | 10 2010 027 984 A1 | 10/2011 |
| WO | WO-8905905 A1 | 6/1989 |

OTHER PUBLICATIONS

German Office Action dated Jul. 4, 2014 from the German Patent Office for Serial No. 10 2013 207 097.7; 6 pages.

* cited by examiner

*Primary Examiner* — Thomas Moulis
*Assistant Examiner* — Elizabeth Hadley

(57) ABSTRACT

An oxygen sensor system for a vehicle includes a pump control module, a correction module, and a fuel control module. While fueling of an engine is cut off, the pump control module selectively turns ON an air pump that pumps ambient air into an exhaust system of the vehicle upstream of a universal exhaust gas oxygen (UEGO) sensor and a catalyst. The correction module receives an output of the UEGO sensor, selectively determines a correction for the output of the UEGO sensor when the air pump is ON and the fuel is cut off, and adjusts the output of the UEGO sensor based on the correction to produce a corrected output. The fuel control module, during fueling of the engine, selectively controls the fueling based on the corrected output.

18 Claims, 4 Drawing Sheets

OXYGEN SENSOR OUTPUT CORRECTION SYSTEMS AND METHODS

FIELD

The present application relates to internal combustion engines and more particularly to oxygen sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A fuel system injects fuel for an engine of a vehicle. A fuel control system controls the fuel system to control fuel injection amount and timing. The fuel control system includes an inner control loop and an outer control loop. The inner control loop may use data from an exhaust gas oxygen (EGO) sensor located upstream from a catalyst in an exhaust system. The catalyst receives exhaust gas output by the engine.

The inner control loop selectively adjusts the amount of fuel provided to the engine based on the data from the upstream EGO sensor. For example only, when the upstream EGO sensor indicates that the exhaust gas is (fuel) rich, the inner control loop may decrease the amount of fuel provided to the engine. Conversely, the inner control loop may increase the amount of fuel provided to the engine when the exhaust gas is lean. Adjusting the amount of fuel provided to the engine based on the data from the upstream EGO sensor modulates the air/fuel mixture combusted within the engine at approximately a desired air/fuel mixture (e.g., a stoichiometry mixture).

The outer control loop selectively adjusts the amount of fuel provided to the engine based on data from an EGO sensor located downstream from the catalyst. For example only, the outer control loop may use the data from the upstream and downstream EGO sensors to determine an amount of oxygen stored by the catalyst and other suitable parameters. The outer control loop may also use the data from the downstream EGO sensor to correct the data provided by the upstream and/or downstream EGO sensors when the downstream EGO sensor provides unexpected data.

SUMMARY

An oxygen sensor system for a vehicle includes a pump control module, a correction module, and a fuel control module. While fueling of an engine is cut off, the pump control module selectively turns ON an air pump that pumps ambient air into an exhaust system of the vehicle upstream of a universal exhaust gas oxygen (UEGO) sensor and a catalyst. The correction module receives an output of the UEGO sensor, selectively determines a correction for the output of the UEGO sensor when the air pump is ON and the fuel is cut off, and adjusts the output of the UEGO sensor based on the correction to produce a corrected output. The fuel control module, during fueling of the engine, selectively controls the fueling based on the corrected output.

A method for a vehicle includes: while fueling of an engine is cut off, selectively turning ON an air pump that pumps ambient air into an exhaust system of the vehicle upstream of a universal exhaust gas oxygen (UEGO) sensor and a catalyst; receiving an output of the UEGO sensor; selectively determining a correction for the output of the UEGO sensor when the air pump is ON and the fuel is cut off; adjusting the output of the UEGO sensor based on the correction to produce a corrected output; and, during fueling of the engine, selectively controlling the fueling based on the corrected output.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
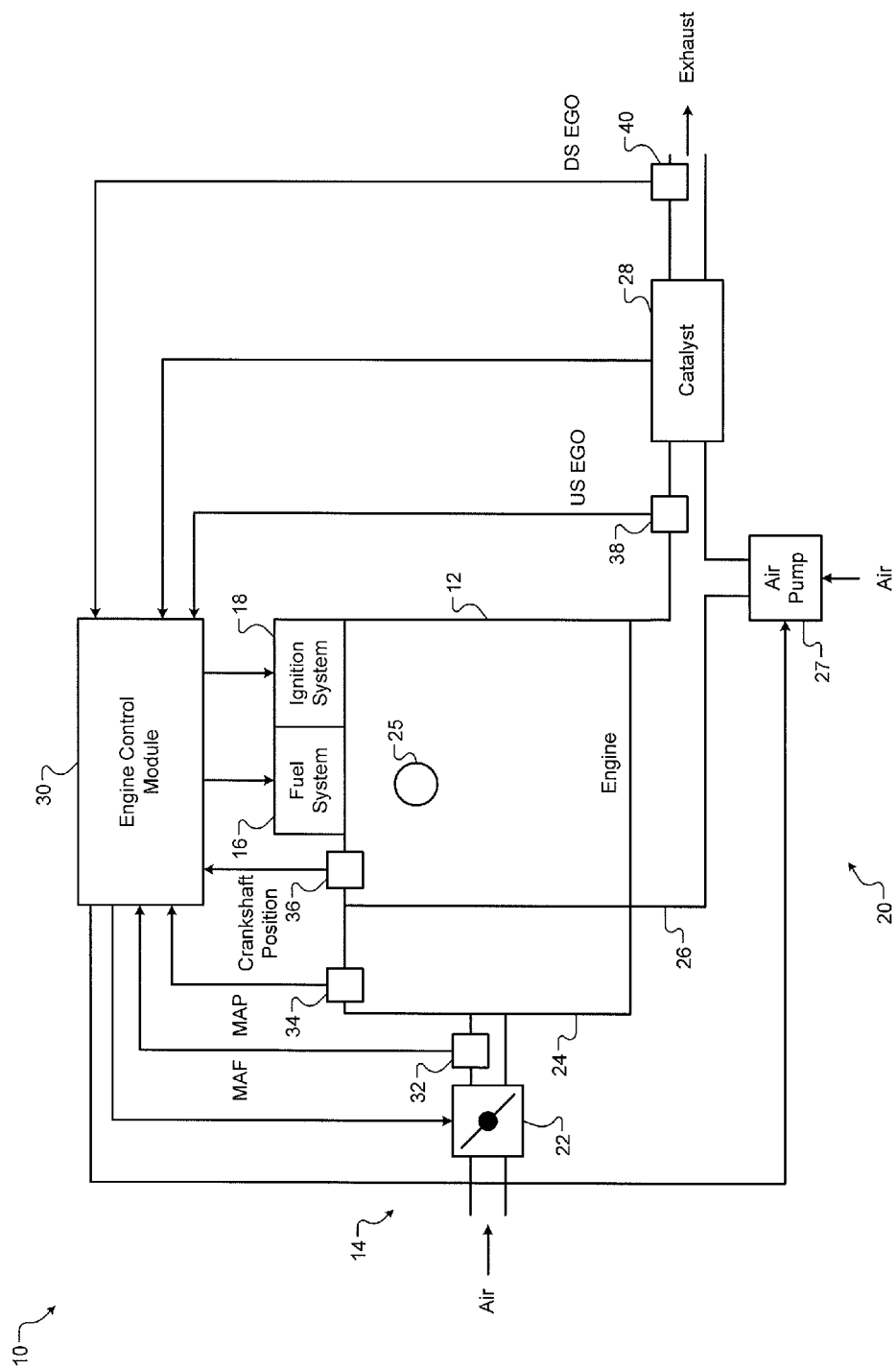
FIG. 1 is a functional block diagram of an example engine system according to the present disclosure.

An engine produces exhaust and expels the exhaust to an exhaust system. The exhaust travels through the exhaust system to a catalyst. A first exhaust gas oxygen (EGO) sensor measures oxygen in the exhaust upstream of the catalyst and generates an output based on the measured oxygen. A second EGO sensor measures oxygen in the exhaust downstream of the catalyst and generates an output based on the measured oxygen.

An engine control module (ECM) controls an amount of fuel provided to the engine. The ECM may selectively adjust the amount of fuel provided to the engine based on the amount of oxygen upstream of the catalyst measured by the first EGO sensor. The ECM may also selectively adjust the amount of fuel provided to the engine based on the amount of oxygen downstream of the catalyst measured by the second EGO sensor.

However, accuracy of the measurements provided by the first EGO sensor may decrease over time. For example only, a decrease in the accuracy of the measurements provided by the first EGO sensor may be caused by a shift in impedance of a sensing element of the first EGO sensor. The sensing element may suffer such a shift after being subjected to various conditions, such as excessive temperature or temperature cycling over a long period. Accuracy may also be reduced by shifts in pumping current due to exposure to silicon, phosphorus, calcium, or lead, and/or the one or more other types of contaminants. Such a shift may also occur due to aging during normal operation.

To account for inaccuracy of the measurements of the first EGO sensor, the ECM determines a correction for the measurements of the first EGO sensor. The ECM modifies the measurements based on the correction determined. The ECM may use the corrected measurements for one or more reasons, such as adjusting fueling to the engine as described above.

The ECM may cut off fuel to the engine under various circumstances, such as for a deceleration fuel cutoff (DECO)

event. During fuel cutoff (FCO) events, the engine pumps ambient air through the engine and into the exhaust system. The ECM may determine the correction during a FCO event. However, as a throttle valve of the engine may significantly reduce airflow through the engine during FCO events, the engine may be unable to pump enough ambient air into the exhaust system to ensure that a predictable amount of oxygen is present at the first oxygen sensor.

The ECM of the present disclosure selectively turns ON an air pump during a FCO event. When ON, the air pump pumps ambient air into the exhaust system upstream of the first EGO sensor. Once the air pump has been ON for a predetermined period during the FCO event, only ambient air (and therefore a predictable amount of oxygen) should be present at the first oxygen sensor. The ECM then determines the correction for the measurements of the first EGO sensor based on the relationship between the measured amount of oxygen in the freshly pumped in ambient air and the expected/predictable amount.

Referring now to FIG. 1, a functional block diagram of an example engine system 10 is presented. The engine system 10 includes an engine 12, an intake system 14, a fuel system 16, an ignition system 18, and an exhaust system 20. The intake system 14 may include a throttle 22 and an intake manifold 24. The throttle 22 controls air flow into the intake manifold 24. Air flows from the intake manifold 24 into one or more cylinders within the engine 12, such as cylinder 25. While only the cylinder 25 is shown, the engine 12 may include more than one cylinder.

The fuel system 16 controls the injection of fuel into the engine 12. The ignition system 18 selectively ignites an air/fuel mixture within the cylinders of the engine 12 using spark. The air of the air/fuel mixture is provided via the intake system 14, and the fuel of the air/fuel mixture is provided by the fuel system 16.

Exhaust resulting from combustion of the air/fuel mixture is expelled from the engine 12 to the exhaust system 20. The exhaust system 20 includes an exhaust manifold 26, an air pump 27, and a catalyst 28. For example only, the catalyst 28 may include a three-way catalyst (TWC) and/or another suitable type of catalyst. The catalyst 28 receives the exhaust output by the engine 12 and reacts with various components of the exhaust. When ON, the air pump 27 pumps ambient air into the exhaust system 20 upstream of the catalyst 28. The air pump 27 may be referred to as a secondary air injection (SAI) pump in various implementations.

The engine system 10 also includes an engine control module (ECM) 30 that regulates operation of the engine system 10. The ECM 30 communicates with the intake system 14, the fuel system 16, the ignition system 18, and the air pump 27. The ECM 30 controls the intake system 14 to regulate airflow into/through the engine 12. The ECM 30 controls the fuel system 16 to regulate the amount and timing of fuel injection. The ECM 30 controls the ignition system 18 to control spark timing. The ECM 30 controls whether the air pump 27 is ON or OFF to regulate pumping of air into the exhaust system 20.

The ECM 30 also communicates with various sensors. For example only, the ECM 30 may communicate with a mass air flow (MAF) sensor 32, a manifold air pressure (MAP) sensor 34, a crankshaft position sensor 36, and other suitable sensors. The MAF sensor 32 measures a mass flowrate of air flowing into the intake manifold 24 and generates a MAF signal based on the mass flowrate. The MAP sensor 34 measures pressure within the intake manifold 24 and generates a MAP signal based on the pressure. In some implementations, engine vacuum may be measured with respect to ambient pressure.

The crankshaft position sensor 36 monitors rotation of a crankshaft (not shown) of the engine 12 and generates a crankshaft position signal based on the rotation of the crankshaft. The crankshaft position signal may be used to determine an engine speed (e.g., in revolutions per minute). The crankshaft position signal may also be used for cylinder identification and one or more other suitable purposes.

The ECM 30 also communicates with exhaust gas oxygen (EGO) sensors associated with the exhaust system 20. For example only, the ECM 30 communicates with an upstream EGO sensor (US EGO sensor) 38, a downstream EGO sensor (DS EGO sensor) 40, and/or one or more other sensors associated with the exhaust system 20. The US EGO sensor 38 is located upstream of the catalyst 28, and the DS EGO sensor 40 is located downstream of the catalyst 28. The US EGO sensor 38 is located downstream of where the air pump 27 pumps air into the exhaust system 20.

The US and DS EGO sensors 38 and 40 measure an amount of oxygen in at their respective locations and generate an EGO signal based on the amounts of oxygen. For example only, the US EGO sensor 38 generates an upstream EGO (US EGO) signal based on the amount of oxygen upstream of the catalyst 28. The DS EGO sensor 40 generates a downstream EGO (DS EGO) signal based on the amount of oxygen downstream of the catalyst 28.

The US and DS EGO sensors 38 and 40 each include a universal EGO (UEGO) sensor. A UEGO sensor may also referred to as a wide band oxygen sensor, a wide range oxygen sensor, wide range air/fuel sensor, etc. A switching EGO sensor generates an EGO signal in units of voltage, and switches the EGO signal between a low voltage (e.g., approximately 0.2 V) and a high voltage (e.g., approximately 0.8 V) when the oxygen concentration is lean and rich, respectively. In contrast with switching EGO sensors, a UEGO sensor generates an EGO signal that corresponds to an equivalence ratio (EQR) measured by the UEGO sensor and provides measurements (e.g., in voltage) between rich and lean.

Figure 2:
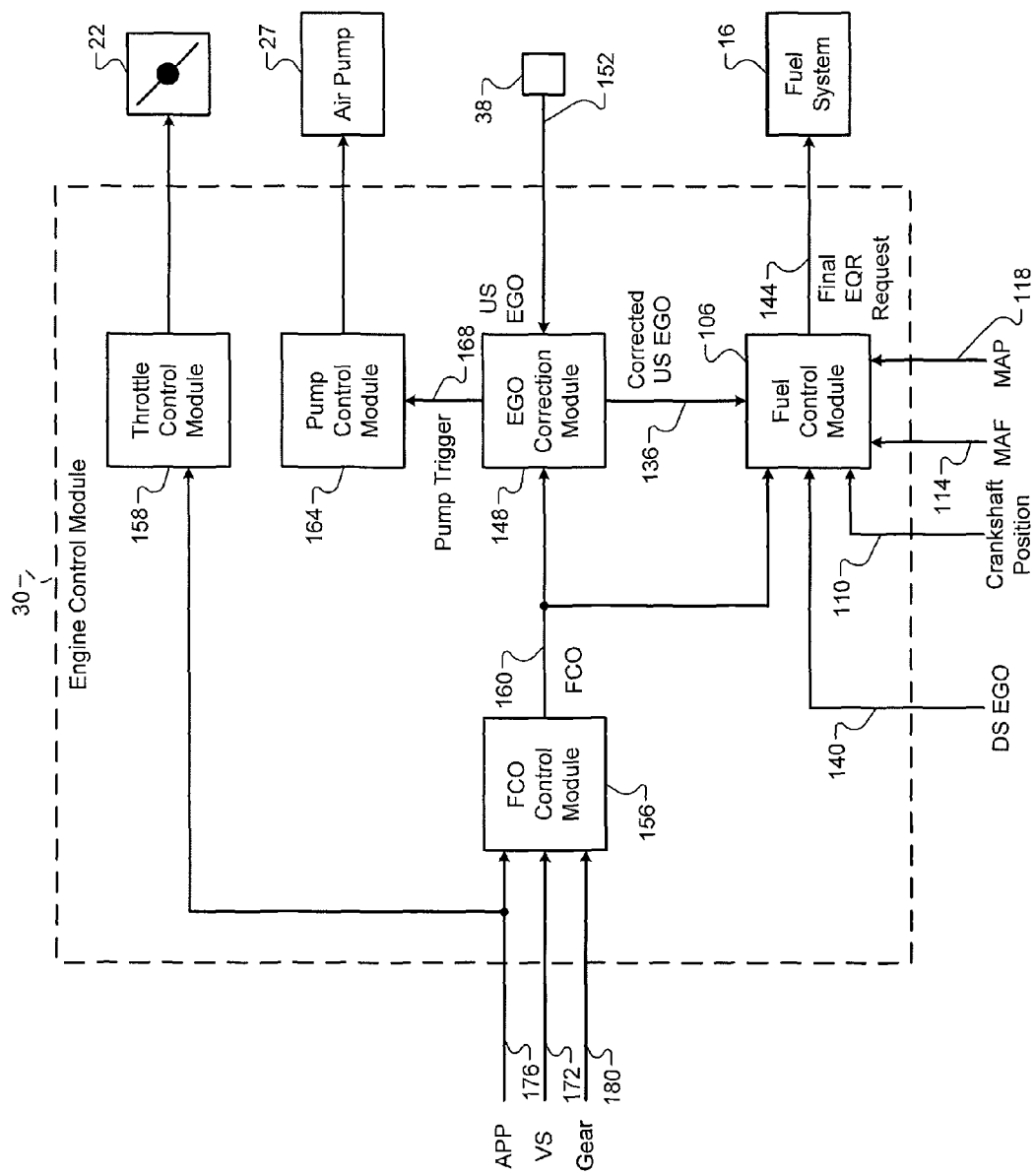
FIG. 2 is a functional block diagram of an example engine control module according to the present disclosure.

Referring now to FIG. 2, a functional block diagram of an example implementation of the ECM 30 is presented. The ECM 30 may determine one or more engine operating conditions. For example only, the engine operating conditions may include, but are not limited to, engine speed, air per cylinder (APC), engine load, and/or other suitable parameters.

The engine speed may be generated based on a crankshaft position 110 generated using the crankshaft position sensor 36. The APC may be predicted for one or more future combustion events in some engine systems. The APC may be generated based on a MAF 114 measured using the MAF sensor 32, a MAP 118 measured using the MAP sensor 34, and/or one or more other suitable parameters. The engine load may be determined based on, for example, a ratio of the APC to a maximum APC of the engine 12. The engine load may alternatively be determined based on an indicated mean effective pressure (IMEP), engine torque, or another suitable parameter indicative of engine load.

A fuel control module 106 generates a base equivalence ratio (EQR) request. The base EQR request may be generated based on an APC. The base EQR request may correspond to an amount of fuel that, with the APC, may achieve a desired equivalence ratio (EQR). For example only, the desired EQR may include a stoichiometric EQR (i.e., 1.0).

The fuel control module 106 may also generate one or more open-loop fueling corrections for the base EQR request. The open-loop fueling corrections may include an error correction. For example only, the error correction may correspond to a correction in the base EQR request to account for errors that may occur, such as errors in the determination of APC and errors attributable to provision of fuel vapor to the engine 12 (i.e., fuel vapor purging). The open-loop fueling corrections may also include a downstream error correction generated based on a difference between a desired downstream EGO (DS desired EGO) and a DS EGO 140 generated using the DS EGO sensor 40.

The open-loop fueling corrections may also include an oxygen storage correction and an oxygen storage maintenance correction. For example only, the oxygen storage correction may correspond to a correction in the base EQR request to adjust the oxygen storage of the catalyst 28 to a desired oxygen storage within a predetermined period. The oxygen storage maintenance correction may correspond to a correction in the base EQR request to modulate the oxygen storage of the catalyst 28 at approximately the desired oxygen storage.

The fuel control module 106 may also generate a reference signal. For example only, the reference signal may include a sinusoidal wave, triangular wave, or another suitable type of periodic signal. The fuel control module 106 may selectively vary the amplitude and/or the frequency of the reference signal. For example only, the fuel control module 106 may increase the frequency and amplitude as the engine load increases and vice versa.

The reference signal may be used by the fuel control module 106 to generate a final EQR request 144 that toggles the EQR of the exhaust gas provided to the catalyst 28 between a predetermined rich EQR and a predetermined lean EQR and vice versa. For example only, the predetermined rich EQR may be approximately 3 percent rich (e.g., an EQR of 1.03), and the predetermined lean EQR may be approximately 3 percent lean (e.g., an EQR of approximately 0.97). Toggling the EQR from the predetermined rich EQR to the predetermined lean EQR and vice versa may improve the efficiency of the catalyst 28. Additionally, toggling the EQR from the predetermined rich EQR to the predetermined lean EQR and vice versa may be useful in determining whether faults are present in the US EGO sensor 38, the catalyst 28, the DS EGO sensor 40, and/or one or more other components.

The fuel control module 106 determines an expected US EGO for a given time. The expected US EGO may correspond to an expected value of a corrected US EGO 136 at the given time. As described further below, an EGO correction module 148 corrects the US EGO signal 152 generated by the US EGO sensor 38 to produce the corrected US EGO 136.

The fuel control module 106 selectively adjusts the final EQR request 144 based on the corrected US EGO 136. For example, the fuel control module 106 determines an upstream EGO error (US EGO error) based on a difference between the corrected US EGO 136 and the expected US EGO. The US EGO error may correspond to, for example, a correction in the base EQR request to minimize the difference between the corrected US EGO 136 and the expected US EGO.

The fuel control module 106 may also determine an imbalance (fueling) correction for the cylinder 25. The fuel control module 106 may determine an imbalance correction for each of the cylinders. The imbalance corrections may also be referred to as individual cylinder fuel correction (ICFCs) or fueling corrections. The imbalance correction for a cylinder may correspond to, for example, a correction in the base EQR request to balance a combustion parameter of the cylinder (e.g., torque) with the combustion parameters of the other cylinders.

The fuel control module 106 determines the final EQR request 144 based on the base EQR request, the fueling corrections, the reference signal, the US EGO error, and the imbalance fueling corrections. For example only, the fuel control module 106 may determine the final EQR request 144 for a cylinder based on a sum of the base EQR request, the fueling corrections, the reference signal, and the US EGO error. The fuel control module 106 may determine the final EQR request 144 for the cylinder based on a product of the sum and the imbalance correction for the cylinder 25. The fuel system 16 selectively injects fuel based on the final EQR request 144. For example only, the fuel control module 106 may control the fuel system 16 using pulse width modulation (PWM).

As described above, the EGO correction module 148 (see also FIG. 3) corrects the US EGO signal 152 generated by the US EGO sensor 38 to produce the corrected US EGO 136. The EGO correction module 148 corrects the US EGO signal 152 using a correction to produce the corrected US EGO 136. The correction will be referred to as a US EGO correction.

Over time, the accuracy of the US EGO signal 152 generated by the US EGO sensor 38 may decrease. The decrease may be attributable to aging, shifting of the impedance of a sensing element of the US EGO sensor 38 (which may occur with age), poisoning of the sensing element, and/or one or more other factors. Example factors that may cause a decrease in the accuracy of the US EGO signal 152 include, but are not limited to, temperature affects, silicon poisoning, phosphorus poisoning, calcium poisoning, and lead poisoning.

The EGO correction module 148 selectively determines (learns) the US EGO correction and adjusts the US EGO signal 152 based on the US EGO correction. Adjusting the US EGO signal 152 based on the US EGO correction ensures that the corrected US EGO 136 accounts for the accuracy of the US EGO signal 152. The EGO correction module 148 determines the US EGO correction when known conditions are present at the US EGO sensor 38.

For example, when fuel to the engine 12 is shutoff during a fuel cutoff (FCO) event, fresh air is pumped through the engine 12. An FCO control module 156 controls performance of FCO events. FCO events include, for example, deceleration fuel cutoff (DECO) events and other suitable types of FCO events during which air is pumped through the engine 12.

The FCO control module 156 may determine whether to perform a DECO event, for example, based on a vehicle speed (VS) 172, a position of an accelerator pedal (APP) 176, a gear ratio 180, and one or more other suitable parameters. A state of an FCO signal 160 indicates whether an FCO event is being performed. The fuel control module 106 may generate the final EQR request 144 to disable fueling to the engine 12 when the FCO signal 160 is in an active state.

However, closing of the throttle valve 22 that occurs during FCO events may prevent the engine 12 from pumping enough air into the exhaust system 20 to ensure that known conditions are present at the US EGO sensor 38. A throttle control module 158 may control opening of the throttle valve 22 based on one or more driver inputs, such as the APP 176. The throttle control module 158 may adjust the throttle valve 22 to and/or maintain the throttle valve 22 at an idle throttle position during an FCO event.

In view of the throttling of the engine 12, the EGO correction module 148 triggers a pump control module 164 to turn the air pump 27 ON to pump air into the exhaust system 20 during an FCO event. The EGO correction module 148 may trigger the pump control module 164 to turn the air pump 27 ON via a pump trigger 168. For example only, the EGO correction module 148 may set the pump trigger 168 to an active state to trigger the pump control module 164.

Once the air pump 27 has been ON for a predetermined period during an FCO event, known conditions are present at the US EGO sensor 38. More specifically, only ambient air should be present at the US EGO sensor 38 when the air pump 27 has been ON for the predetermined period during the FCO event. The EGO correction module 148 determines (learns) the US EGO correction once the air pump 27 has been ON for the predetermined period during an FCO event.

Once determined, the EGO correction module 148 adjusts the US EGO signal 152 based on the US EGO correction to generate the corrected US EGO 136 until a next time that the US EGO correction is determined. The US EGO correction may be determined, for example, once per drive cycle or at another suitable frequency. A drive cycle may refer to a period between when control modules of a vehicle are turned ON in response to user input and when the control modules are next turned OFF.

Figure 3:
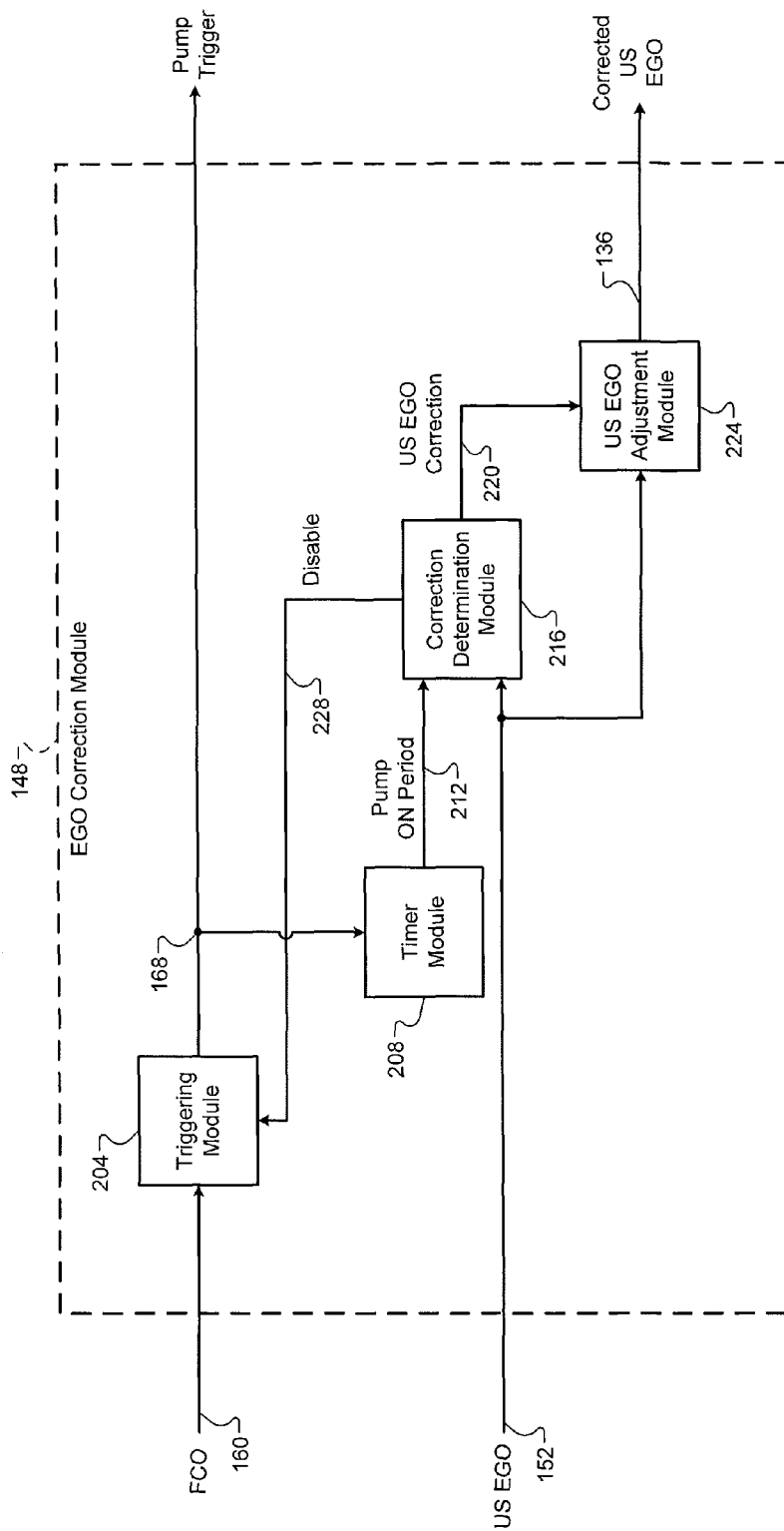
FIG. 3 is a functional block diagram of an example exhaust gas oxygen correction module according to the present disclosure.

Referring now to FIG. 3, a functional block diagram of an example implementation of the EGO correction module 148 is presented. A triggering module 204 may set the pump trigger 168 to the active state when an FCO event is being performed. Fuel is cut off for an FCO event, and the throttle valve 22 may be maintained in the idle throttle position during the FCO event. The FCO signal 160 may indicate whether an FCO event is being performed. The pump control module 164 turns the air pump 27 ON in response to the pump trigger 168 transitioning from an inactive state to the active state.

A timer module 208 may reset a pump ON period 212 in response to the pump trigger 168 transitioning from the inactive state to the active state. The timer module 208 may increment the pump ON period 212 as time passes. In this manner, the pump ON period 212 tracks the period elapsed since the air pump 27 was turned ON during the FCO event.

A correction determination module 216 monitors the pump ON period 212. The correction determination module 216 also monitors the US EGO signal 152 generated by the US EGO sensor 38. When the pump ON period 212 is greater than the predetermined period, the correction determination module 216 determines a US EGO correction 220 based on the US EGO signal 152. In other words, the correction determination module 216 determines the US EGO correction 220 based on the US EGO signal 152 once the air pump 27 has been ON for the predetermined period during the FCO event. When the air pump 27 has been ON for the predetermined period during the FCO event, only ambient air should be present at the US EGO sensor 38. For example only, the predetermined period may be approximately five seconds or another suitable period.

In various implementations, the timer module 208 may initialize the pump ON period 212 based on the predetermined period and decrement the pump ON period 212 as time passes. In such implementations, the correction determination module 216 may determine the US EGO correction 220 once the pump ON period 212 reaches zero.

The correction determination module 216 determines the US EGO correction 220 further based on a predetermined value for the US EGO signal 152. The predetermined value corresponds to an expected value of the US EGO signal 152 when only ambient air is present at the US EGO sensor 38. The correction determination module 216 may set the US EGO correction 220 based on a difference between the US EGO signal 152 and the predetermined value. For example only, the correction determination module 216 may set the US EGO correction 220 using one of a function and a mapping that relates the difference to the US EGO correction 220.

Once the US EGO correction 220 has been determined, the correction determination module 216 may generate a disable signal 228. The triggering module 204 may transition the pump trigger 168 to the inactive state, and the pump control module 164 may turn the air pump 27 OFF, in response to the pump trigger 168 transitioning from the active state to the inactive state or when the FCO event ends.

The US EGO correction 220 may be a scalar, an offset value, or another suitable value. A US EGO adjustment module 224 receives the US EGO correction 220 and the US EGO signal 152. The US EGO adjustment module 224 adjusts the US EGO signal 152 based on the US EGO correction 220 to generate the corrected US EGO 136. The US EGO adjustment module 224 may, for example, set the corrected US EGO 136 equal to a product of the US EGO correction 220 and the US EGO signal 152 if the US EGO correction 220 is a scalar value. If the US EGO correction 220 is an offset value, the US EGO adjustment module 224 may set the corrected US EGO 136 equal to a sum of the US EGO correction 220 and the US EGO signal 152. The US EGO adjustment module 224 may adjust the US EGO signal 152 based on the US EGO correction 220 under all operating conditions.

Figure 4:
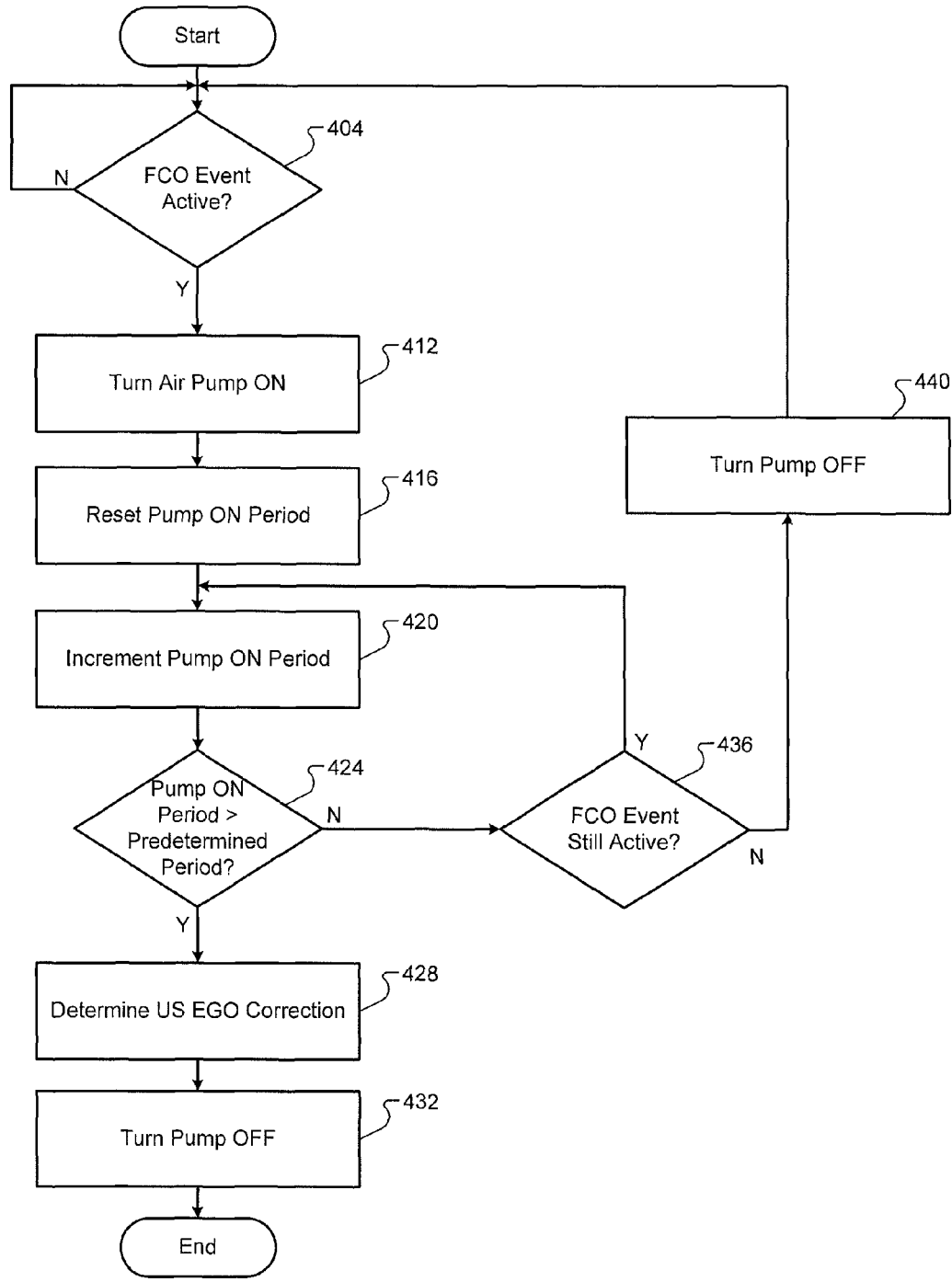
FIG. 4 is a flowchart depicting an example method of determining a correction for correcting measurements of exhaust gas oxygen sensor located upstream of a catalyst according to the present disclosure.

Referring now to FIG. 4, a flowchart depicting an example method of determining the US EGO correction 220 is presented. Control may begin with 404 where control determines whether an FCO event is being performed. If true, fuel is cut off, air is pumped through the engine 12 while the throttle valve 22 is adjusted to and/or maintained at the idle throttle position, and control may continue with 412. If false, control may remain at 404.

At 412, control turns ON the air pump 27. The air pump 27 pumps ambient air into the exhaust system 20 upstream of the US EGO sensor 38. At 416, control may reset the pump ON period 212. Control may increment the pump ON period 212 at 420. In this manner, the pump ON period 212 tracks the period that has passed since the air pump 27 was turned ON during the FCO event.

At 424, control may determine whether the pump ON period 212 is greater than the predetermined period. If true, control may continue with 428; if false, control may transfer to 436, which is discussed further below. For example only, the predetermined period may be approximately five seconds or another suitable period.

Control may determine (learn) the US EGO correction 220 based on a difference between the US EGO signal 152 generated by the US EGO sensor 38 and the predetermined value at 428. The predetermined value may be calibrated and may be set to an expected value of the US EGO signal 152 when only ambient air is present at the US EGO sensor 38. Once the US EGO correction 220 has been determined, control may turn the air pump 27 OFF at 432, and control may end. Control may thereafter use the US EGO correction 220 to adjust the US EGO signal 152.

At 436, when the air pump 27 has not yet been ON for the predetermined period, control determines whether the FCO event is still being performed. If true, control may return to 420 and wait for the pump ON period 212 to become greater than the predetermined period so the US EGO correction 220 can be determined. If false, control may turn the air pump 27 OFF at 440 and return to 404 for determining the US EGO correction 220 during a next FCO event.

While learning the US EGO correction 220 is shown and discussed in conjunction with EGO events, the US EGO correction 220 could also be learned under other circumstances. For example, in some hybrid vehicles, such as extended range electric vehicles, the ECM 30 may wake up while the engine 12 and the vehicle are not otherwise being used (e.g., key OFF). The air pump 27 could be turned ON and the US EGO correction 220 could be learned while the engine 12 and the vehicle are not otherwise being used (e.g., key OFF).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An oxygen sensor system for a vehicle, comprising:
a pump control module that, while fueling of an engine is cut off, selectively turns ON an air pump that pumps ambient air into an exhaust system of the vehicle upstream of a universal exhaust gas oxygen (UEGO) sensor and a catalyst;
a throttle control module that closes a throttle valve to an idle throttle position while the fuel is cut off and the air pump is ON;
a correction module that receives an output of the UEGO sensor, that selectively determines a correction for the output of the UEGO sensor when the air pump is ON and the fuel is cut off, and that adjusts the output of the UEGO sensor based on the correction to produce a corrected output; and
a fuel control module that, during fueling of the engine, selectively controls the fueling based on the corrected output.

2. The oxygen sensor system of claim 1 wherein the correction module determines the correction when a period that the air pump has been ON during the fuel cut off is greater than a predetermined period.

3. The oxygen sensor system of claim 1 wherein the correction module sets the corrected output equal to a product of the correction and the output of the UEGO sensor.

4. The oxygen sensor system of claim 1 wherein the correction module sets the corrected output equal to a sum of the correction and the output of the UEGO sensor.

5. The oxygen sensor system of claim 1 wherein the correction module determines the correction based on the output of the UEGO sensor when the air pump is ON and the fuel is cut off.

6. The oxygen sensor system of claim 5 wherein the correction module determines the correction further based on an expected value of the output.

7. The oxygen sensor system of claim 6 wherein the correction module determines the correction based on a difference between the output and the expected value of the output.

8. The oxygen sensor system of claim 7 wherein the correction module determines the correction using one of a function and a mapping that relates the difference to the correction.

9. The oxygen sensor system of claim 1 further comprising a fuel cutoff (FCO) module that selectively cuts off of the fuel during vehicle deceleration.

10. A method for a vehicle, comprising:
while fueling of an engine is cut off, selectively turning ON an air pump that pumps ambient air into an exhaust system of the vehicle upstream of a universal exhaust gas oxygen (UEGO) sensor and a catalyst;
while the fuel is cut off and the air pump is ON, closing a throttle valve to an idle throttle position;
receiving an output of the UEGO sensor;
selectively determining a correction for the output of the UEGO sensor when the air pump is ON and the fuel is cut off;
adjusting the output of the UEGO sensor based on the correction to produce a corrected output; and,
during fueling of the engine, selectively controlling the fueling based on the corrected output.

11. The method of claim 10 further comprising determining the correction when a period that the air pump has been ON during the fuel cut off is greater than a predetermined period.

12. The method of claim 10 further comprising setting the corrected output equal to a product of the correction and the output of the UEGO sensor.

13. The method of claim 10 further comprising setting the corrected output equal to a sum of the correction and the output of the UEGO sensor.

14. The method of claim 10 further comprising determining the correction based on the output of the UEGO sensor when the air pump is ON and the fuel is cut off.

15. The method of claim 14 further comprising determining the correction further based on an expected value of the output.

16. The method of claim 15 further comprising determining the correction based on a difference between the output and the expected value of the output.

17. The method of claim 16 further comprising determining the correction using one of a function and a mapping that relates the difference to the correction.

18. The method of claim 10 further comprising selectively cutting off of the fuel during vehicle deceleration.

\* \* \* \* \*

UNITED STATES PATENT AND TRADEMARK OFFICE
CERTIFICATE OF CORRECTION

PATENT NO. : 9,133,785 B2  
APPLICATION NO. : 13/457905  
DATED : September 15, 2015  
INVENTOR(S) : Michael L. Kociba et al.

Page 1 of 1

It is certified that error appears in the above-identified patent and that said Letters Patent is hereby corrected as shown below:

On the Title Page,

Please change Item [76] to read Item [75]

Item [73] Assignee, insert the following:
--GM Global Technology Operations LLC, Detroit, MI (US)--

Signed and Sealed this
Twenty-eighth Day of June, 2016

Michelle K. Lee
*Director of the United States Patent and Trademark Office*